Jan. 17, 1967   M. R. GUSTAVSON ETAL   3,298,920
PROCESS FOR PRODUCING NITRIC ACID
Filed Jan. 27, 1960   3 Sheets-Sheet 2

INVENTORS
MARVIN R. GUSTAVSON
DAVID R. SAWLE
ARTHUR T. BIEHL
BY:
Lippincott & Ralls
ATTORNEYS

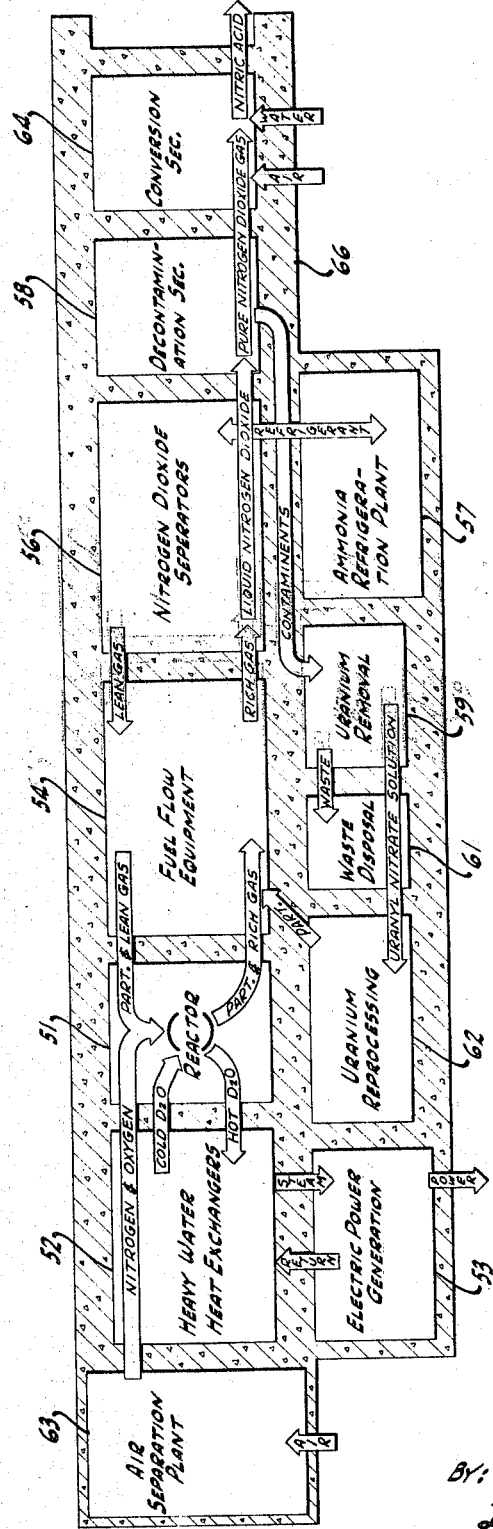

United States Patent Office 3,298,920
Patented Jan. 17, 1967

3,298,920
PROCESS FOR PRODUCING NITRIC ACID
Marvin R. Gustavson, Walnut Creek, David R. Sawle, Lafayette, and Arthur T. Biehl, Diablo, Calif., assignors, by mesne assignments, to Aerojet-General Corporation, El Monte, Calif., a corporation of Ohio
Filed Jan. 27, 1960, Ser. No. 5,060
1 Claim. (Cl. 176—39)

The present invention relates in general to an improved chemical reaction process and also to an improved nuclear reactor which is advantageous in carrying out a portion of the reaction process.

There is herein provided an improved process of carrying out chemical reactions requiring large amounts of energy to be supplied for the accomplishment of the reaction. Such energy is herein supplied by fission fragments obtained from nuclear fission reactions. In this respect, it is noted to be well known that the great majority of energy liberated from the atomic fission of uranium, for example, appears as kinetic energy in the resulting atomic fragments. It is herein contemplated that the kinetic energy of fission fragments shall be directly converted to chemical energy. This is accomplished by utilizing the high local apparent temperatures created by the passage of fission fragments through a fluid to be reacted. An ionization track is produced along the path of recoiling fission fragments, inasmuch as the energy density in the fluid along such path is raised to a level which corresponds to a temperature of about 10,000 degrees Kelvin. It is particularly noted in this respect that the energy liberated by the disruption of a nucleus is roughly 100,000,000 times that involved in chemical bonds, so that the energy from a single fission event is capable of producing many millions of molecules of a chemical compound. The passage of high energy fission fragments through a fluid operates to disrupt the molecules of the fluid along the fragment path, so that atoms are liberated. In this manner then, there is provided a sufficient energy to carry out particular desired chemical reactions, and although it will be readily appreciated that a multitude of reactions are, of course, possible, it has been found to be quite feasible to carry out particular desired reactions by the maintenance of a relatively simple system composed of a few elements, so that the number of groupings of atoms is maintained sufficiently limited to attain a substantial fraction of a single desired type thereof.

Further regarding the improved chemical reaction process of the present invention, there is herein achieved an almost instantaneous quenching of the reaction, inasmuch as normal molecular collisions in the fluid will transfer local excess energy out of the ionization track and into the surrounding fluid extremely rapidly. As a consequence of this very rapid quenching, the re-grouping of atoms following ionization or disruption of the original molecules thereof will be frozen, and it is thus possible to produce chemical compounds in substantial quantity. The apparent temperature along the ionization track of recoil fragments from atomic fission will be lowered in times of the order of millionths of a second to the ambient fluid temperature, so that the regrouped atoms formed at the high temperatures along the track will then have insufficient energy to decompose. In this manner it is thus possible to form highly energetic and unstable compounds by the substantially direct conversion of atomic energy to chemical energy.

While the improved chemical process of the present invention is widely applicable, it has been found to be highly advantageous in the fixation of nitrogen. In accordance with the present invention, it is possible to directly produce nitrogen dioxide from the normal constituents of air through the utilization of the energy of recoil fragments from atomic fission. One possible highly useful product of such a reaction is nitric acid, which may be conventionally processed from nitrogen dioxide by the addition of water and oxygen after separation of the nitrogen dioxide from unreacted gases and admixed radioactive fragments. Particularly advantages of the chemical process hereof as same is applied to the fixation of nitrogen, include the following: the only raw materials required are air and water, a low operating temperature is combined with a high effective processing temperature, the process has an inherent ultrafast built-in quench, and the process achieves the direct conversion of nuclear energy to chemical energy.

The improved nuclear reactor of the present invention is adapted to the production of power by relatively conventional conversion of reaction energy to heat of an intermediate fluid, for example, which may then be converted directly or indirectly into usable power as, for example, in the form of electricity. Additionally, the reactor hereof is particularly adapted to the accomplishment of the direct conversion of atomic energy to chemical energy. In this latter respect, the nuclear reactor hereof is admirably suited for utilization in the improved chemical reaction process of the present invention. The reactor hereof utilizes a fluid fuel which is continuously circulated through the reactor structure. It is evident that certain material advantages and advances over conventional nuclear reactors result from this particular fuel system. In accordance herewith, the reactor fuel is composed of a fluid within which there is substantially uniformly distributed a fine dispersion of fissionable material. This fissionable material, for example uranium or the like, is provided as very small particles having cross sectional dimensions of the order of a few microns. A required mass of fissionable material for carrying out a continuous fission process is attained in the reactor hereof by the concentration of a sufficient amount of fluid in a limited volume of desired configuration, and it will be appreciated that by the continuous circulation of the fluid hereof containing the fissionable material through the reacting volume, it is thus possible to continuously reactivate the fissionable material, and thus to attain a truly continuously operating nuclear reactor. Such reprocessing may be carried out at a distance from the reactor proper, so as to reduce the hazards and difficulties of such processing and to obviate prior-art difficulties in the handling of fuel rods, and the like. Additionally, the former problems of reactor poisoning are herein obviated.

A further noteworthy attribute of the present reactor is the very substantial improvement in reactor safety attainable herewith. Thus, in reactor structure employing fuel fluid in the form of a smoke composed of a gas carrying finely-divided particles of fissionable material, it is almost impossible for an explosive nuclear incident to occur. While the escape of the smoke fuel would certainly not be desirable, any failure of reactor parts which might otherwise produce such a result will be seen to herein cause a dispersion of the fissionable material, rather than a concentration thereof, so that no explosion is possible. The reactor may thus be considered to have an inherent negative coefficient of reactivity so as to provide a high degree of safety.

It is an object of the present invention to provide an improved chemical process wherein very high localized energy is available for producing chemical reactions, and almost instantaneous quenching of the reaction is achieved.

It is another object of the present invention to provide an improved chemical process having a low operating temperature, and yet providing a very high effective processing temperature.

It is a further object of the present invention to provide a highly economical chemical process for carrying out reactions at extreme temperatures, which may yet be contained by normal materials because of the relatively low overall temperature of the material being reacted.

A still further object of the present invention is to provide an improved continuous flow process for nitrogen fixation.

Another object of the present invention is to provide an improved nuclear reactor employing a fluid fuel.

It is yet another object of the present invention to provide an improved nuclear chemical reactor, and more particularly, an improved nuclear nitrogen fixation reactor.

A further object of the present invention is to provide an improved plant and process for the economical fixation of nitrogen.

Various other possible objects and advantages of the present invention will become apparent to those skilled in the art from the following description of the process, and nuclear reactor of the present invention. It is not intended to limit the present invention by the terms of the following description, and, instead, reference is made to the appended claims for a precise delineation of the true scope of the present invention.

The present invention is illustrated as to the improved nuclear reactor hereof, in the accompanying drawings, wherein:

FIG. 4 schematically illustrates the nuclear reactor and associated processing plant for the fixation of nitrogen, all in accordance with the present invention.

Figure 1:
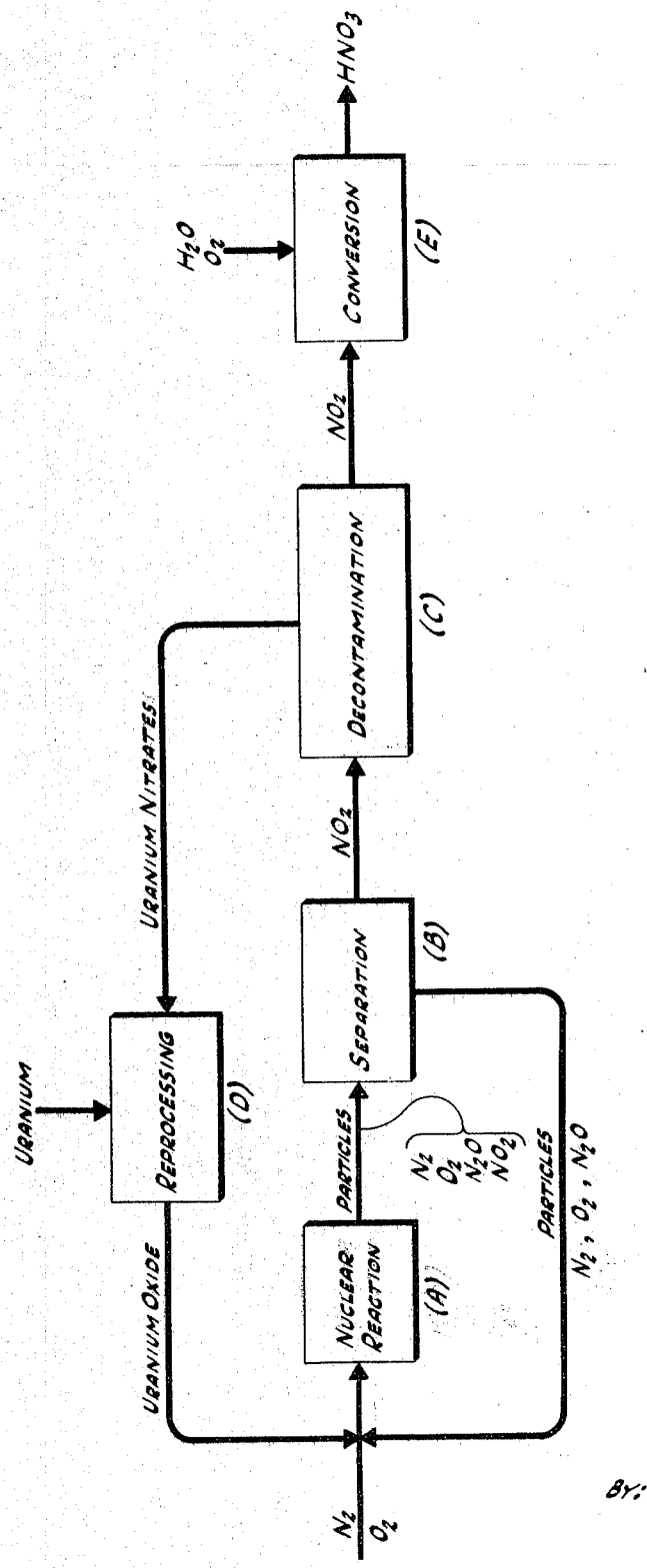
FIG. 1 is a flow diagram illustrating the steps of the chemical reaction process of this invention as applied, for example, to the fixation of nitrogen.

Considering first the improved chemical reaction process of the present invention, the process herein described is particularly directed to the economic and advantageous accomplishment of endothermic chemical reactions. Many chemical reactions require the addition of heat in order for same to proceed with measurable rapidity, and certain disassociation reactions are well recognized to fall in this category. Thus, for example, the disruption of the molecular bonds in nitrogen requires the attainment of very high temperatures, for the strength of molecular nitrogen-nitrogen bonds is far in excess of the molecular bonds of other gases such as hydrogen and oxygen, for example. A substantial difficulty is encountered in attaining the desired reaction temperatures for various endothermic reactions, inasmuch as very stringent and oftentimes impossible requirements are placed upon material employed to contain the reactants. Thus, referring again to the example of nitrogen disassociation, only a small fraction of the nitrogen reactant can be disassociated by conventional processes such as the arc process, or the "Wisconsin process," because of the temperature limitations imposed by the material employed to contain the reaction. The process hereof operates to provide reaction temperatures of the order of 10,000 degrees Kelvin, so as to thereby establish conditions which are highly favorable to rapid accomplishment of those endothermic reactions which proceed satisfactorily only at very high temperatures. Directly associated with this problem of high temperature reactions is the extreme reactivity of the reactants at such temperatures, and in order to terminate the reaction at a desired point to attain particular chemical compounds therefrom, it is necessary to rapidly lower the temperature of the reactants so as to prevent further and undesirable reactions. This rapid lowering of the reaction temperature, or quenching as it is commonly called, is herein provided in a manner quite different from conventional chemical processing. Quenching by molecular collision is herein employed to attain quenching times of the order of one millionth of a second, and it will be readily appreciated that this figure is many orders of magnitude shorter than those available in conventional processing.

Specifically, the chemical reaction process of the present invention is carried out through the utilization of atomic energy produced by the nuclear fission of conventional fissionable material, such as uranium, for example. In clear distinction to conventional radiation chemistry processing, the present invention provides for the intimate mixing of fluid reactants with finely-divided particles of fissionable material. There is produced, in accordance herewith, a substantially uniform dispersion of finely-divided particles of fissionable material throughout the reacting fluid, so that upon nuclear fission of such particles the fission fragments recoiling from the fission reaction pass directly through the reactant fluid, so as to thereby deposit the energy thereof within the fluid. In the instance of the fission of uranium atoms, for example, it is well known that up to eighty-four percent of the 200,000,-000 electron volt energy liberation appears as kinetic energy of the recoil fragments. Only a relatively small amount of the fission energy appears in gamma rays, and the like, so that by the utilization of the fission fragment energy the present invention operates to attain a very high conversion efficiency from atomic energy to chemical energy. Recoiling fission fragments from a nuclear fission reaction are known to have a very short range, so that these fragments are normally not available for utilization exteriorly of the immediate fission reaction vicinity. In accordance herewith, an intimate admixture of the reactant and the fissionable material particles undergoing fission reactions provides for the passage of recoil fission fragments through the reactant and a consequent liberation of the majority of the energy of the fission reaction directly into the fluid reactant. The recoil fragments from nuclear fission have an electron deficiency, and in their passage through a fluid expend their energy in the disruption of molecules along the path thereof. These disrupted molecules are ionized, so that it is conventional to refer to the path of fission fragments as an ionization track. Along this ionization track of the fission fragments, there is provided an effective temperature of about 10,000 degrees Kelvin, and by the utilization of this temperature to carry out chemical reactions it is possible, in accordance herewith, to efficiently and advantageously accomplish endothermic chemical reactions, such as, for example, the disassociation of nitrogen. Inasmuch as the fission fragment energy is dissipated along an ionization track which is surrounded by the reactant fluid, it will be appreciated that temperature reduction or energy dissipation is herein accomplished by molecular collision. This mechanism of quenching is many times faster than conventional mechanical quenching methods. Consequently, the reactivity of chemicals subjected to the extremely high effective temperature along the ionization track of fission fragments is almost instantaneously lowered, so as to thereby reduce the reactivity to such an extent that the particular results of the high temperature reaction remain unreacted. Stated otherwise, an endothermic reaction may be herein carried out by the subjection of reactants to fission fragment energy, and the results of such reaction may be frozen and maintained through the almost instantaneous reduction in temperature of same. In this manner then, it is possible to carry out nitrogen fixation reactions, for example, as well as various other endothermic reactions, including a multitude of disassociation reactions.

Particular process parameters are of importance in carrying out the improved chemical reaction process of the present invention, and in this respect it is noted that the physical size of the particles of fissionable material are of substantial importance. One criteria in this respect is the range of fission fragments. Thus, if the individual particles of fissionable material are of substantial size, it will be appreciated that an atomic fission reaction within the particle will produce recoil fragments which do not have a sufficient range in the material of the particle to pass exteriorly therefrom, and, consequently, no fission fragment energy liberation into the reactant fluids surrounding the particle will result. Of further importance in this respect is the ability of the particles of fissionable material to be suspended in the reactant fluid. In the instance wherein the fluid to be reacted is provided in the form of a gas, it is necessary for the particles of fissionable material to be quite small in order for a desirable suspension and relatively even dispersion to be attained. In this respect, substantial investigation has indicated that fissionable material particles may be employed in a dimensional range of about one-tenth micron to ten microns.

Further criteria are also of substantial importance in connection with the particular manner of carrying out the chemical reaction process of the present invention. Thus, for example, the utilization of submicron particles poses certain additional difficulties in the instance wherein a gas having suspended particles therein is subjected to flow through curved conduits, or the like, inasmuch as the smaller particles tend to plate out or deposit upon the curved surfaces of the conduit. Balancing the various factors involved, including the availability of fission fragments from the particles, provides a preferred average particle size in the range of 0.1 to 3 microns for maximum efficiency consistent with practicability. The dispersion of particles of this size range in the gas produces an aerosol wherein the particles tend to remain relatively evenly dispersed throughout the gas.

In order to properly evaulate and identify the chemical reaction process hereof, it is advantageous to define a parameter reflecting the efficiency with which the energy deposited in the reactant is used to bring about the desired reactions therein. A suitable parameter in this respect has been found to be the "quantum yield" or "G" value, which is herein defined as the net change in the number of molecules of a given species per 100 electron volts of deposited energy. Of interest in determining the quantum yield of the process hereof, is the efficiency with which the fission fragment energy is deposited in the reactant, and this has been determined to be a function of the stopping powers of the particles of fissionable material and reactant, as well as the weight loadings and particle sizes. Extended calculations indicate that for a particular chemical reaction process there may be expected an energy deposition efficiency of about 95 percent. It is well known that of the 200,000,000 electron volt energy release in a single fission event, about 168,000,000 electron volts or 84 percent thereof, appears as kinetic energy in the fission fragments, and certain counterbalancing factors related to an exact determination of this figure are found to leave this figure substantially unchanged. In the application of the chemical reaction process of the present invention to any particular chemical reaction, it is possible to calculate from known factors and by conventional means the probable conversion efficiency.

In addition to the above-described steps of the process hereof, wherein there is attained an extremely high reaction temperature in the presence of a low operating temperature, and followed by an ultrafast quenching time to fix the reaction products, there yet remain the steps of separating the desired reaction products from the fluid and admixed fissionable material particles and fission fragments. For a continuous cycle process, the reacted fluid and contaminants are operated upon to disengage the remaining fissionable material particles from the fluid. This fluid is then separated to remove the desired products of reaction formed in the foregoing steps of the process. This separated product is then decontaminated to remove vestigial traces of radioactivity which may remain, and is subsequently available as a direct product of manufacture, or, alternatively, as a constituent for further chemical reactions to produce particular desired chemicals therefrom. The disengaged fissionable material particles may be reprocessed and remixed with the unreacted fluid for return to the reaction volume. The addition of makeup fluid and further fissionable material particles may be accomplished prior to the readmission of this mixture to the reaction volume. It will be seen that in accordance with the above-described steps of the present invention there is provided a continuous chemical reaction process, wherein recycling accompanied by the addition of makeup materials results in a continuous flow of product from the process. In the determination of the quantum yield desired, and, in fact, attainable in accordance with the present process, it is of importance to realize that as the percentage of reacted materials increases in the fluid during atomic fission, the probability of additional and undesirable reactions may be detrimental to the yield. It is thus necessary to form a balance between the extent of reaction during each single cycling of the process against the difficulties which may be encountered in the separation of relatively small amounts of process products from unreacted portions of the fluid. Although exact proportions depend upon the particular chemical reaction being carried out in accordance with the process hereof, it is generally the case that the process is most advantageous in connection with the production of relatively small amounts of end product per cycle, as economics favor this condition.

Although there has been set forth above a general description of the steps and parameters of the improved chemical reaction process of the present invention, it is believed that same may be best understood by reference to a single example, and in this respect there is herein taken the fixation of nitrogen in accordance with the present process as an exemplary illustration of the process. Nitrogen fixation is admirably suited to be carried out by the process hereof, inasmuch as a relatively simple chemical system is involved. Nitrogen fixation is carried out in accordance with this process by the provision of a fluid wherein the composition has a ratio of about four to one in favor of nitrogen to oxygen. Within this fluid there is uniformly dispersed particles of fissionable material. In this example there is employed enriched uranium as one of the oxides thereof and same is provided in a ratio of uranium to gas of 0.10. Chemical reactions which may occur in a gaseous mixture of nitrogen and oxygen bombarded by fission fragments include the following:

(1) $N+O_2 \rightarrow NO+O$; (2) $N+NO_2 \rightarrow 2NO$ (3) $N+NO_2 \rightarrow N_2O+O$ and (4) $N+NO_2 \rightarrow N_2+O_2$. The additional reaction (5) $N+NO \rightarrow N_2+O$ may also occur, however because of the high partial pressure of oxygen in the reaction fluid, the concentration of nitric oxide is always quite low. Consequently, the reactions of nitric oxide other than the desired reaction which removes the nitric oxide as such from the fluid, namely (6) $2NO+O_2 \rightarrow 2NO_2$ are not further considered herein. In actuality, it has been determined that Reaction 2 is not particularly unfavorable inasmuch as the nitrogen atom is therein fixed in a relatively desirable form. Reaction 3 is somewhat less favorable that Reactions 1 or 2, but not as bad as might be expected, inasmuch as further irradiation of $N_2O$ decomposes same in accordance with the following:

(7) $2N_2O \rightarrow 2N_2O+O_2$ and (8) $N_2O \rightarrow NO+N$ and it has been determined that Reaction 8 proceeds at about three times the rate of Reaction 7. Of the above-noted possible chemical reactions, the most undesirable is that set forth in Reaction 4, inasmuch as it corresponds to the complete loss of two nitrogen atoms from reaction probabilities. Investigation of the relative rates at which the foregoing reactions proceed indicates the rate constants for the reactions as follows: (1) 0.3; (2) 2.5; (3) 1.6; (4) 1.0; and (5) 20. It is believed clear from the foregoing that because of the low rate of reaction identified at (1) as compared to the Reactions 3 and 4, the concentration of nitrogen dioxide must be low in the fluid to attain a high yield.

The foregoing relative rate constants of the identified reactions are set forth for a temperature of 200 degrees C., and inasmuch as Reaction 1 has a substantially larger heat of activation than Reactions 2, 3 or 4, it is preferentially slowed when the temperature is reduced. For this reason the gas temperature substantially less than 200 degrees C. would lead to reduced yields, and, furthermore, temperatures substantially in excess of 200 degrees C. would reverse Reaction 6, so that equilibrium would be shifted to the left thereof. The presence of appreciable amounts of nitric oxide (NO) enhances the rate of the undesired Reaction 5, so that in practice it is highly desirable to limit the process temperature to the general range of 200 degrees C., although the desired reaction will proceed at other temperatures.

Upon the basis of the foregoing, it may be appreciated that the composition of the gas prior to reaction must represent a compromise between that required for high yields and that required for efficient product separation. It has been found, again through extensive investigation, that in order to provide a sufficient concentration of nitrogen dioxide to limit the separation cost, an economic compromise at one percent by volume of nitrogen dioxide in the reacted fluid is substantially optimum. A preferred composition of gas following exposure to fission fragments is as follows:

|  | Percent |
| --- | --- |
| Nitrogen | 80 |
| Oxygen | 18 |
| Nitrous oxide | 1 |
| Nitrogen dioxide | 1 |

It has been found that an absolute gas pressure equal to or greater than 1000 pounds per square inch is highly advantageous in providing a sufficiently high efficiency of energy deposition in the gas, and still meet nuclear requirements. This provides partial oxygen pressure in excess of 180 pounds per square inch, which is found to be quite adequate from the chemical kinetics standpoint. Although higher pressures may be employed, certain disadvantages are found in handling same so that they are not preferred.

In addition to the formation of nitrogen dioxide through the utilization of the energy of fission fragments from atomic fission reactions, the present invention provides for the separation of the nitrogen dioxide from remaining portions of the reactant fluid and entrained fissionable material particles. An application of the present invention to the fixation of nitrogen to form nitric acid is illustrated in FIG. 1 of the drawings, wherein there will be seen to be shown separate blocks indicating the various preferred steps of the present invention as applied to this application. Considering now this specific example of the present invention, there is shown at A a block entitled "Nuclear Reaction" signifying the above-described step of directly converting atomic energy to chemical energy through the medium of fission fragments. There is provided for the accomplishment of this step both nitrogen and oxygen, preferably in the proportion of about 4 to 1, and a finely-divided dispersion of particles of fissionable material, such as an oxide of enriched uranium, in the gas. As above noted, the products of this nuclear reaction include nitrogen, oxygen, nitrous oxide, and nitrogen dioxide, together with unreacted particles of fissionable material and certain products of the atomic fission. This gas and particle combination is then subjected to a separation step, as indicated at B, wherein particles, $N_2$, $O_2$ and $N_2O$ are removed. This particular separation step may be accomplished by fractionating columns or other suitable means. The fuel particles and undesired gases separated from the nitrogen dioxide in Step B are returned to the input of the nuclear reaction, as indicated. Nitrogen dioxide produced from the separation step of the process will contain some entrained particles of fissionable material as well as certain products of atomic fission, and thus there is herein provided the additional step of decontamination, indicated at C, wherein the nitrogen dioxide is purified as, for example, in cyclone separators. The atomic residue, including both particles of fissionable material and products of atomic fission removed from the nitrogen dioxide in this step, is preferably returned through an additional reprocessing step indicated at D, for recombination with additional nitrogen and oxygen, and the gases removed by the separation step to continue the nitrogen fixation cycle. Additional fissionable material may be added to the returned fissionable material as, for example, in the reprocessing step so as to maintain a desired concentration of particles of fissionable material in the input gas to the nuclear reaction. Following decontamination of the nitrogen dioxide herein produced, relatively conventional processing may be carried out by the addition of water and oxygen thereto to form nitric acid, as indicated at E in FIG. 1. By the continual recycling of the fissionable material through the nuclear reaction volume, and by the continual addition of nitrogen and oxygen to the recycled fissionable material to thereby maintain a desired smoke concentration to this nuclear reaction volume, it is herein possible to carry out a continuous fixation process wherein the sole ingredients or raw materials required are nitrogen and oxygen, together with a relatively small amount of fissionable material in the form of finely-divided particles having a size of the order of 0.1 to 3 microns in diameter.

The nuclear fuel employed in the process may consist of any suitable compound of elements of fissionable material, such as uranium or plutonium, and uranium may be provided in enriched or unenriched form. Furthermore, uranium, for example, may be used in a variety of compounds, such as oxides, carbides, nitrates, or nitrides; however, in the fixation of nitrogen, the abundance of oxygen available will normally oxidize the uranium, so that a uranium oxide, such as $UO_2$ or $U_2O_3$ may as well be initially employed.

Figure 2:
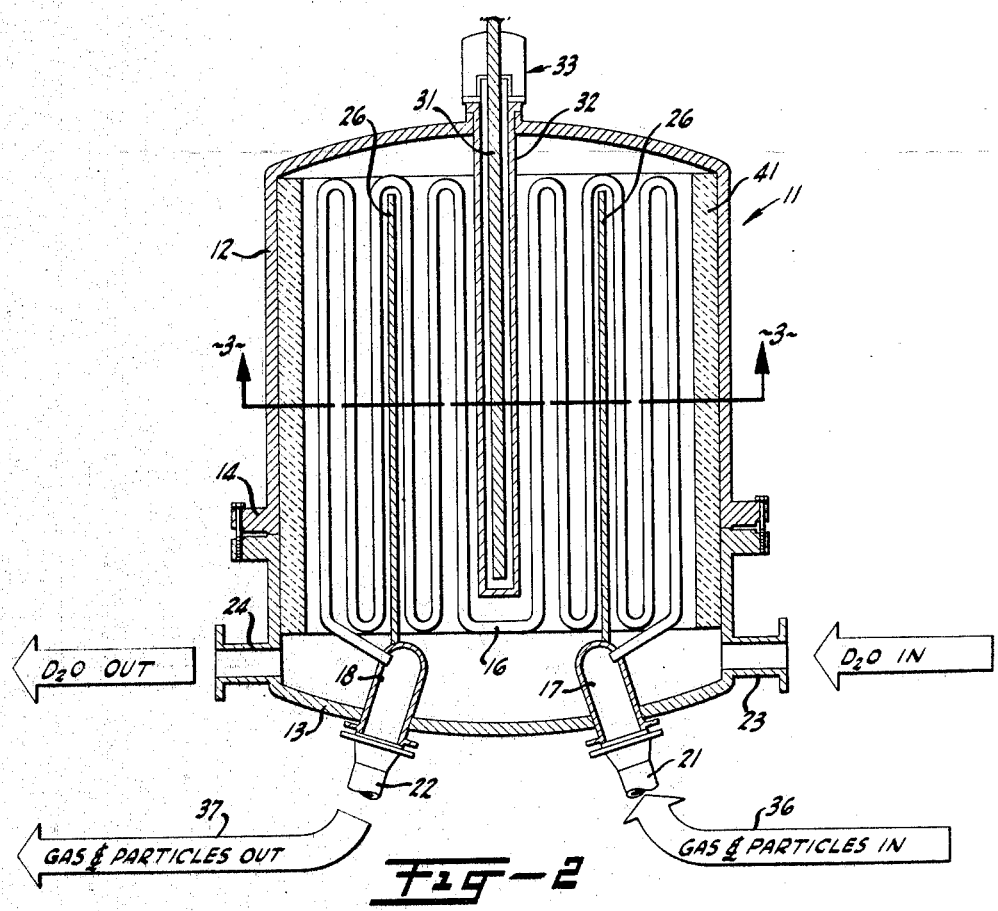
FIG. 2 is a schematic illustration of the nuclear reactor of this invention and showing the reactor in vertical section.
Figure 3:
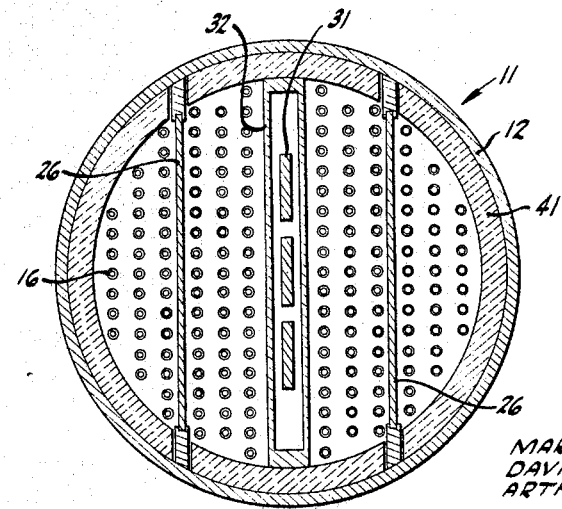
FIG. 3 is a transverse sectional view of the nuclear reactor taken in the plane 3—3 of FIG. 2.

It will be appreciated that the individual steps of the present invention, such as those indicated in connection with the fixation of nitrogen above, may be carried out with various apparatus; however, in this respect the improved nuclear reactor of the present invention is particularly desirable in the accomplishment of the nuclear reaction, wherein the energy of nuclear fission is directly employed in the accomplishment of desired chemical reactions. In this respect, attention is invited to FIGS. 2 and 3 of the drawings, wherein there is schematically illustrated a preferred embodiment of the nuclear reactor of the present invention. Referring to FIGS. 2 and 3, there will be seen to be shown a pressure vessel 11 formed, for example, of upper and lower portions 12 and 13, suitably secured together as by means of bolts 14 through mating circumferential flanges. This pressure vessel is adapted to contain the nuclear reaction, and within the vessel there are provided a plurality of convoluted pipes 16 extending from an intake manifold 17 to an outlet manifold 18. These manifolds extend through the shell of the pressure vessel 11, as at the bottom thereof, and are adapted to be connected to fuel inlet and outlet conduits 21 and 22, respectively. As noted above, the nuclear fuel for the reactor of the present invention is provided as a fluid containing a substantially even dispersion of finely-divided particles of fissionable material, and this fuel is circulated through the tubing 16 within the pressure vessel of the reactor, so as to thereby establish a critical mass of fissionable material for the purposes of nuclear reactions. By the concentration of a suitable mass of fissionable material in desired overall dimensions, it is possible, in accordance with well-known theory to produce nuclear fission wherein thermal neutrons liberated by the material cause a splitting of the nucleus of atoms of uranium, or the like, with a consequent liberation of very substantial amounts of energy. Inasmuch as the physics of nuclear reactions are well known and are widely treated in the art, no further description of the nuclear reaction is believed herein necessary, nor is such included.

In order to moderate the nuclear reaction so as to insure the presence of a desired amount of thermal neutrons within the reaction volume, there is herein provided for the circulation of a moderating fluid throughout the pressure vessel and about the tubes 16 therein. There are provided inlet and outlet connections 23 and 24, respectively, extending through the shell of the pressure vessel 11 for the flow of a liquid moderator therethrough. It is herein contemplated that the moderator shall flow about the tubes 16 within the pressure vessel and the moderating may, for example, be $D_2O$. It is possible to employ other moderating materials, and for certain processes normal water or paraffin hydrocarbons, such as hexane or octane, are suitable. In order to attain maximum utilization of the moderating fluid, and to provide for the desired moderation of the nuclear reaction carried out within the pressure vessel 11, provision is made for constraining the moderating fluid to perform a multi-pass traverse through the vessel. This is herein accomplished by the provision of a plurality of baffles 26, which may be disposed across the vessel in extension upward from the bottom thereof, and terminating below the top of the vessel so as to form the equivalent of a number of weirs within the vessel.

Control over the nuclear reaction carried out within the pressure vessel by nuclear fuel in the form of smoke, or the like, passing through the tube 16 of the vessel is herein afforded by one or more control rods 31, extending downwardly into the vessel along the center line thereof from the top of the vessel, and encased, for example, by a suitable casing 32 depending from the top of the vessel. Control rod drive means 33 are provided atop the vessel and exteriorly thereof for engagement with the control rods 31 to controllably move same vertically into and out of the pressure vessel so as to thereby dispose a desired volume of neutron absorbing material within the vessel at the control of the operator. This particular portion of the present invention is wholly conventional in that control rods are well known in the art, and a multitude of control rod drive mechanisms are also well known in the art. Suitable sealing means are provided atop the vessel for extension of the control rods therefrom, while yet sealing the moderating fluid within the vessel. With the moderator inlet and outlet connections 23 and 24 at the bottom of the pressure vessel, it will be seen that the path of moderating fluid in flowing through the vessel extends upwardly over the first baffle 26 and thence downwardly beneath the control rod casing 32, from whence the fluid must then flow upwardly over the second baffle 26 in order to reach the outlet connection at the bottom of the vessel. In this manner, there is thus provided a four-pass flow for moderating fluid through the vessel, and it will be appreciated that various modifications of this flow may be accomplished in accordance with the present invention.

In operating of the reactor described above, there is provided a fluid fuel indicated by the arrow 36 directed into the inlet line 21 through the lower portion of the pressure vessel shell 11, and forced into the fuel inlet manifold 17 under a pressure of the order of 1000 pounds per square inch. This nuclear fuel, indicated by the arrow 36, may, for example, comprise a smoke formed of nitrogen and oxygen gases with an intimate admixture of finely-divided particles of fissionable materials, such as $U_3O_8$, which are evenly dispersed throughout the gas. These particles of fissionable material have a diameter sufficiently small that they remain suspended within the gas by the natural convection currents therein, and the inlet fluid fuel is in effect the equivalent of an aerosol, wherein the suspended particles do not tend to settle out of the gas. The inlet fuel which is provided to the inlet manifold 17 within the pressure vessel 11 is forced through a large multitude of convoluted tubes 16 within the pressure vessel, so as to perform a multitude of traverses through the vessel before reaching the outlet manifold 18. In the process of passing through the reactor vessel, the nuclear fuel undergoes nuclear fission reactions wherein individual nuclei of the fissionable material are split by thermal neutrons with a consequent large release of energy appearing primarily as kinetic energy of the fission fragments. It is well recognized that the range of fission fragments is quite small because of the very substantial mass of such fragments, and thus it is possible to deposit a majority of the energy released by the fission reaction directly in the fluid carrying the particles of fissionable material. As set forth above, this energy may be directly employed to produce desired chemical reactions for a direct conversion of atomic energy to chemical energy. It will, of course, be further appreciated that a very substantial amount of heat is liberated in the process of the reaction within the tubes of the reactor. The moderating fluid flowing through the pressure reactor about the tubes will thus be heated and will consequently leave the pressure vessel with a substantially greater energy than same had upon entering the vessel. This relatively high temperature moderating fluid discharged from the pressure vessel may be employed to produce electrical power as, for example, by means of an intermediate fluid, such as water, which may be turned into steam and thence employed to drive turbine generators. The moderating fluid may be recirculated through the pressure vessel, and it is intended that such shall be the case, inasmuch as $D_2O$ is relatively expensive and consequently cannot be economically discarded. The reactor hereof will thus be seen to be suited to the production of power as in the form of electrical energy, and also to be suited to the production of chemical reactions in the fuel fluid. The outlet fluid 37 which has passed through the pipes 16 of the reactor will, upon leaving the exit line 22, be enriched in particular reaction products, such as, for example, nitrogen dioxide in the instance wherein nitrogen and oxygen are employed as the fluid within which the particles of fissionable material are suspended in passage through the reactor.

Certain particular advantages accrue to the reactor structure of the present invention and specific note is herein made thereof. Thus, the present invention employs a fluid fissionable fuel, wherein a constant circulation of fuel through the reaction volume is attained. One advantage of this particular circulatory system lies in the fact that the nuclear fuel may thus be reprocessed in a closed cycle connected through the reactor proper, and, consequently, the prior-art problems of reactor poisoning and necessary reactor shutdown for the replacement of fuel elements is herein obviated. Of a further and very important advantage, it is herein noted that the reactor fuel is employed within the reactor proper under a relatively high pressure. Thus, in the instance wherein the nuclear fuel is in the form of a smoke, it will be appreciated that failure of a tube, or the like, within the reactor, as may possibly result from overheating, will cause a gas to escape from such rupture or point of damage. Inasmuch as the fuel is in the form of a high-pressure gas any escape of same from the pressure vessel 11 will, at most, cause a radioactive contamination of the surrounding area, but will, under no circumstances, allow the reactor to run away and to thereby approach and possibly reach a critical value wherein a nuclear explosion could result. Furthermore, with the continual flow of nuclear fuel through the reactor, it is obviously possible to almost immediately vary the concentration or amount of fuel within the reactor, and so that fully aside from conventional safety devices normally associated with nuclear reactors, the present invention will be seen to have an inherent negative coefficient of reactivity so that nuclear incidents are almost impossible with the reactor design of the type herein described. By the utilization of a fluid both within the tubes of the reactor and flowing about the tubes, it will be seen that the possibility of hot spots in the reactor is quite remote. As contrasted to more conventional reactor designs, the present invention will thus be seen to have a wide margin of safety, and to be thereby highly advantageous and practical for many applications wherein conventional nuclear reactors are considered too hazardous.

It will, of course, be appreciated that the illustration in FIGS. 2 and 3 of the drawings of this application is intended only to be schematic, and no effort has been made to accurately identify the number of tubes in the pressure vessel through which the fissionable material flows, nor to fully illustrate all possible safety features which may be normally associated with a nuclear reactor. In this respect there would normally also be provided appropriate reflecting means which may include, in part, a graphite reflector 41, suitably mounted, for example, circumferentially about the interior of the vessel 11.

As an aid to a full understanding of the present invention, and not by way of limitation, there follows a physical description of one specific reactor structure formed in accordance with the present invention.

(A) Cylindrical core:
  Diameter _____ ft.__ 9
  Height _____ ft.__ 12
  $D_2O$ moderator _____ %__ 40
  Structural material _____ %__ 12
  Smoke _____ %__ 48
  Critical mass _____ kg.__ 54.1
  $U^{235}$ weight loading gm. of $U^{235}$/gm. of $N_2$ __ 0.11
  Average thermal neutron
    flux _____ n./cm.$^2$-sec.__ $3.3 \times 10^{13}$
  Number of individual tubes _____ 200
  Passes per tube _____ 16
  Length of tube _____ ft.__ 187
  I.D. of tube _____ in.__ 1.1
  O.D. of tube _____ in.__ 1.5
  Diameter of $U_3O_8$ particles _____ microns 0.3 to 3.0
  Reflector:
    $D_2O$ _____ in.__ 3
    Carbon _____ in.__ 8
  Core Volume _____ ft.$^3$__ 340
  Efficiency of utilization of recoil energy ____ %__ 95
  Temperature coefficient of
    reactivity _____ $-5.4 \times 10^{-5}$/° F.
(B) Smoke:
  Operating pressure _____ p.s.i.a.__ 1000
  Inlet temperature _____ ° F.__ 390
  Outlet temperature _____ ° F.__ 430
  Density _____ lbs./ft.$^3$__ 3.06
  Viscosity _____ lbs./hr.-ft.__ 0.061
  Thermal conductivity ____ B.t.u./hr.-ft.-° F.__ 0.022
  Specific heat _____ B.t.u./lb. ° F.__ 0.25
  Gas flow rate _____ lbs./hr.__ $1.6 \times 10^6$
  Linear velocity through tube _____ ft./sec.__ 101
(C) Moderator ($D_2O$):
  Operating pressure _____ p.s.i.a.__ 300
  Inlet temperature _____ ° F.__ 210
  Outlet temperature _____ ° F.__ 410
  Density _____ lb./ft.$^3$__ 68.6
  Viscosity _____ lbs./hr.-ft.__ 0.44
  Specific heat _____ B.t.u./lb. ° F.__ 1.0
  $D_2O$ flow rate _____ lbs./hr.__ $1.7 \times 10^6$ In addition to the reactor proper, schematically illustrated in FIGS. 2 and 3 of the drawings, there are also associated with same certain exterior elements and connections which serve to provide for the full and proper functioning of the reactor, and which with proper consideration further serve to materially enhance the economic feasibility of the reactor hereof. In this respect, an overall plant design for the production of both power and nitric acid with the reactor hereof is schematically illustrated in FIG. 4 of the drawings. This exemplary reactor, which may be denominated as a Nuclear Nitrogen Fixation Reactor, is shown as including a reactor proper 51 which may be substantially the same as that described above, and which has associated therewith a heavy water heat exchanger 52, providing for the flow of the moderator $D_2O$ into and out of the pressure vessel of the reactor. This heat exchanger 52 may be further associated with an electric power generation system 53, which may be operated by an intermediate fluid, such as water, to form steam from the energy of the heavy water leaving the reactor to generate electrical power.

Within the reactor 51 there is carried out a nuclear reaction wherein fission fragments deposit energy along ionization tracks in the gas formed of nitrogen and oxygen carrying fissionable material particles so as to thereby produce desired chemical reactions wherein nitrogen dioxide is formed. From the reactor there is exhausted what may be termed "rich" gas, inasmuch as same contains an enrichment of nitrogen dioxide desired as an end product, together with fissionable material particles and products of fission reactions including fission fragments. This rich gas and entrained particles is exhausted to fuel flow equipment 54, wherein suitable filtering devices, and the like, are employed to remove the majority of particles and fission fragments from the gas. From the fuel flow equipment 54, the rich gas, now substantially cleansed of particles and the like, but yet remaining radioactive, is directed into nitrogen dioxide separators 56 wherein nitrogen dioxide is liquefied and separated from the remainder of the rich gas. A refrigeration plant 57 may be provided for the purpose of removing heat from the rich gas to thereby liquefy the nitrogen dioxide in the separating device 56. The liquid nitrogen dioxide from the separators is then directed into a decontamination section 58, wherein the remainder of radioactivity possibly present in the liquid nitrogen dioxide is removed, and in this process it is normal to again raise the temperature of the nitrogen dioxide so that same returns to a gaseous form. With regard to the decontamination section 58, it is of particular importance herein that all traces of radioactivity be removed from the nitrogen dioxide. While certain sources of radioactivity which may be found in the rich gas from the reactor will rapidly decay, so that storage of the gas in gaseous or liquid form for a relatively short period will operate to substantially remove such source, other possible sources of possible radioactivity are relatively long-lived. It is with respect to these latter sources of radioactivity that particular attention is herein directed, and through suitable decontamination procedures it is possible to provide a decontamination factor of $10^{16}$ where a factor of $10^8$ would suffice to provide for adequate removal of radioactivity. The decontamination section may include means for removing volatile contaminants such as xenon and krypton, as well as means for removing soluble contaminants, and in this latter respect scrubbing with nitric acid may be employed. Although a wide variety of decontamination processes are known and may be here employed, it may be advantageous to provide further purification by an addition and dilution method. Thus, a particular radioactive element or compound, such as radioactive strontium for example, may be separated from the process fluid by conventional means to leave, say one percent thereof, unseparated and then one hundred parts of normal strontium added, and the process fluid again subjected to the separation procedure to leave only about 0.1 percent radioactive strontium therein. Purely statistically, it is possible to continue to reduce the amount of any radioactive element by addition of the element in an unradioactive state and reprocessing to remove the element. This may be employed only on the end product, here nitric acid, or may be utilized before separation of the nitric dioxide if desired.

Contaminants removed in the decontamination section 58 include a sufficient quantity of uranium that recovery of same is economically feasible. Thus, as illustrated in FIG. 4, the contaminants from the decontamination section 58 are directed into a uranium removal unit 59, wherein waste materials are separated from uranium and are, in turn, directed into conventional waste disposal means 61. Uranyl nitrates and unreacted uranium oxides and the like recovered in the course of the above processing are directed into the uranium reprocessing unit 62, which serves to not only return the useful fissionable material into suitable form for reuse in the reactor, but also to establish the desired particle size, wherein the smoke fuel may be provided to the reactor. As illustrated in FIG. 4, the particles from the uranium reprocessing unit 62 are directed back into the fuel flow equipment 54, wherein same are mixed with such particles and lean gas as have been returned thereto from the nitrogen dioxide separators 56. This combination is then directed back into the reactor inlet, together with such make-up nitrogen and oxygen as may be required. Suitable nitrogen and oxygen supply means include an air separation plant 63, which requires only air as a raw material, and which operates to produce therefrom a gas having the desired ratio of nitrogen to oxygen, and preferably having almost no contaminating influence such as argon, for example. It has been found that certain gases, such as argon, deleteriously affect the operation of the reactor, and consequently separation of these contaminants from the inlet fluid or smoke to the reactor is highly preferable.

As noted above, the output of the decontamination section 58 of the above-described plant comprises pure nitrogen dioxide gas, and same may then be operated upon in any one of several desired conventional manners to produce useful end results. In this respect, there is illustrated a conversion section 64, where in air and water are combined with the nitrogen dioxide gas in conventional manner to produce nitric acid.

Although a wide variety of physical configurations are possible for a chemical reaction plant in accordance with the present invention and including the novel nuclear reactor hereof, the plant illustration of FIG. 4 contemplates a canyon structure wherein the separate units of the plant are encased in a very substantial concrete shell 66. At least certain portions of the plant operations will be seen to be concerned with highly radioactive materials and thus by the provision of a canyon or tunnel of concrete shielding it is possible to locate the reactor in a central location therein with transverse concrete walls through which appropriate conduits and connections extend to separate plant units along the canyon, and to thereby provide for the necessary containment of such radioactivity as results from the process hereof. The end result herein denominated as nitric acid, will be seen to be wholly free of radioactivity, as is the power output from the electrical power generator of the plant. Thus, the sole extensions from the plant and consisting of the chemical and power outputs thereof are of no danger to personnel. Through the particular illustrated structure of the plant, it is possible to reduce the amount of radiation existing at separate points along the plant layout so as to thereby provide for minimum radiation levels at any particular portion of the plant.

What is claimed is:

A chemical process for producing nitric acid comprising the steps of forming a gas of four parts nitrogen to one part oxygen, dispersing in said gas finely-divided particles of fissionable material to form an aerosol smoke fuel, compressing said smoke fuel and circulating same through convoluted paths in a limited volume to thereby produce atomic fission of the fuel particles whereby fission fragment energy severs molecular nitrogen bonds to free nitrogen atoms which then form oxides, disengaging particles and fission fragments from the reacted fuel to leave rich gas having an increased amount of nitrogen dioxide therein, separating nitrogen dioxide from the rich gas, decontaminating the separated nitrogen dioxide to remove radioactivity therefrom including the steps of mixing into the gas a substantial amount of an impurity which is already present therein in a radioactive state and again separating the impurity from the gas to thus further reduce the concentration of such impurity as a radioactive contaminant in the gas, and reacting the pure nitrogen dioxide with air and water to form nitric acid.

References Cited by the Examiner

UNITED STATES PATENTS

| | | | |
|---|---|---|---|
| 2,898,277 | 8/1959 | Harteck et al. | 176—39 |
| 2,920,874 | 1/1960 | Gardner. | |
| 2,928,780 | 3/1960 | Harteck et al. | 176—10 |
| 2,958,637 | 11/1960 | Voorhees | 176—39 |
| 3,016,738 | 1/1962 | Eule | 176—19 |
| 3,039,548 | 6/1962 | Krucoff | 176—37 |
| 3,050,454 | 8/1962 | Barr et al. | 176—39 |
| 3,054,738 | 9/1962 | Hermans et al. | 176—37 |

FOREIGN PATENTS

| | | |
|---|---|---|
| 1,032,436 | 6/1958 | Germany. |
| 1,053,683 | 3/1959 | Germany. |
| 749,064 | 5/1956 | Great Britain. |
| 809,061 | 2/1959 | Great Britain. |

OTHER REFERENCES

Chemical and Engineering News, Aug. 10, 1959 (pp. 46, 47).

Chemical and Engineering News, Dec. 21, 1959 (pp. 42–44).

REUBEN EPSTEIN, *Primary Examiner.*

ROGER L. CAMPBELL, *Examiner.*

CARL D. QUARFORTH, *Assistant Examiner.*